(No Model.)
E. T. ROBINSON, Dec'd.
C. L. J. ROBINSON, Executrix.
APPARATUS FOR MANUFACTURING FUR HAT BODIES.
No. 595,582. Patented Dec. 14, 1897.
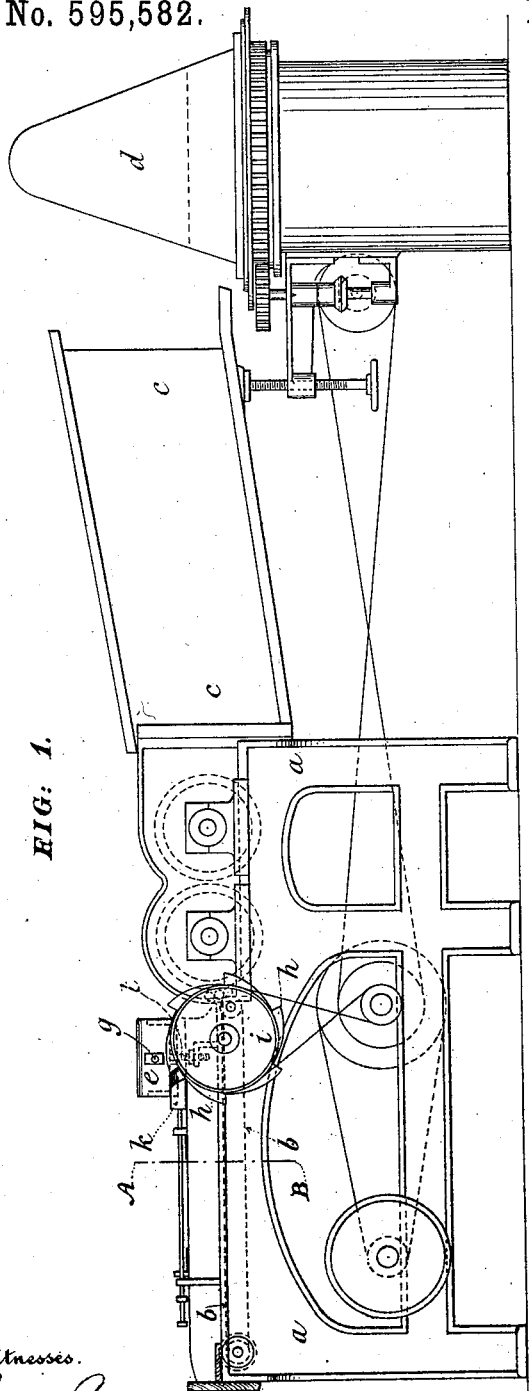
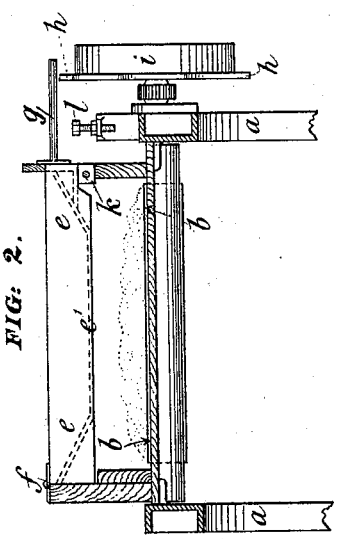
Witnesses.
George Baumann
Edith J. Griswold
Inventor.
Edward Tweedy Robinson
By his Attorneys
Howson and Howson

UNITED STATES PATENT OFFICE.

EDWARD T. ROBINSON, OF DENTON, ENGLAND; CHARLOTTE L. J. ROBINSON EXECUTRIX OF SAID EDWARD T. ROBINSON, DECEASED.

APPARATUS FOR MANUFACTURING FUR HAT-BODIES.

SPECIFICATION forming part of Letters Patent No. 595,582, dated December 14, 1897.

Application filed November 27, 1893. Renewed September 27, 1897. Serial No. 653,223. (No model.) Patented in England November 12, 1892, No. 20,459.

*To all whom it may concern:*

Be it known that I, EDWARD T. ROBINSON, a citizen of the United States, at present residing at Denton, in the county of Lancaster, England, have invented Improved Apparatus for Manufacturing Fur Hat-Bodies, (for which British Patent No. 20,459, dated November 12, 1892, has been obtained,) of which the following is a specification.

My invention consists of an apparatus or appliance for feeding or supplying a certain definite quantity or weight of very short furs to the hat-body during the ordinary process of its formation, so that the said short fur shall be evenly and thoroughly mixed and incorporated with the other fur forming the body, with the purpose of giving an improved "feel" and "finish" to the hats.

The nature of my said invention and the manner in which the same is to be performed or carried into practical effect will be readily understood on reference to the annexed sheet of drawings and the following explanation thereof.

Figure 1 on the drawings is a side elevation of so much of a fur-hat-forming machine as is required to illustrate the application of my invention thereto; and Fig. 2 is a transverse section of part of the same, taken through about the line A B on Fig. 1 and drawn to a larger scale.

$a$ is part of the framing of the machine. $b$ is the endless traveling apron for feeding the fur. $c$ is the trunk through which the fur is drawn, and $d$ is the revolving perforated forming-cone upon which the hat-body is made and which is in communication with the exhaust fan or fans.

For the purposes of my invention I apply to the ordinary fur-hat-forming machine a vibrating or oscillating sieve $e$ (or its equivalent) placed above and near the inner end of the traveling apron $b$, upon which the ordinary fur is fed into the machine. This sieve $e$, into which the very short fur is placed, may be actuated by any convenient means, but I prefer to form it in the shape of a trough $e$ with sloping ends and a sieve bottom $e'$, arranged across the said endless traveling apron $b$ and hinged at one end, as shown at $f$, Fig. 2. The other end is provided with a finger or projection $g$, which (when the apparatus is at work) rests upon a ratchet or cam wheel $h$, attached to or forming part of the pulley $i$, which drives one of the pinions actuating the feed-motion, and thus as the pulley $i$ and the ratchet or cam wheel $h$ revolves the free end of the trough or sieve $e$ is constantly being jolted up and down.

The height of the finger or projection $g$ on the trough $f$ may be adjustable to regulate the delivery of the short fur, or the delivery may be regulated by adjusting the height of a stop $l$, upon which the finger or projection $g$ falls, and the apparatus is provided with a sliding wedge $k$, which when placed beneath the free end of the hinged trough or sieve $e$ raises the finger or projection $g$ up out of the reach of the ratchet or cam wheel $h$, as shown on the drawings, and thus stops the vibration of the trough or sieve $e$, and consequently the delivery of the very short fur.

My process of feeding the short hairs to and mixing them with the ordinary layer of hairs to form the hat-body is carried out in this apparatus in the following manner: A suitable quantity of the ordinary fur having been put on the traveling apron $b$, extending beneath and preferably slightly beyond the vibrating trough or sieve $e$, a certain predetermined amount of the very short fur is put into the latter, which is preferably kept up by the wedge $k$, so that the ratchet or cam wheel $h$ does not move it until a short portion or the ordinary fur has been fed into the machine and drawn onto the forming-cone $d$. The sieve $e$ is then lowered by withdrawing the wedge $k$, and the finger or projection $g$ coming into contact with the ratchet or cam wheel $h$ will cause the sieve $e$ to be vibrated or jolted up and down and sprinkle a layer of the very short fur upon the ordinary fur on the traveling apron $b$, the vibration or oscillation being preferably regulated by the adjusting-screw $l$, so that the charge of very short fur is completely emptied from the sieve $e$ rather before the whole or the ordinary fur has been passed under the same. Thus a thin layer of unmixed long fur can be formed upon the inside and outside surfaces of the hat-body, the bulk of which is a perfect mixture of the long and short furs, the latter being regularly and evenly incorporated with the former, and the appearance and feel of the hat when finished are greatly improved.

I claim as my invention—

1. An apparatus for forming fur hat-bodies, consisting of a hat-forming cone, and feeding mechanism for feeding forward a layer of fur toward the hat-forming cone, in combination with devices for dropping short fur onto said layer as it is fed forward, and exhausting mechanism to draw the combined fur onto the forming-cone and form a hat-body therefrom, substantially as described.

2. An apparatus for forming fur hat-bodies, consisting of a hat-forming cone, feeding mechanism for feeding forward toward the hat-forming cone, a layer of long fur, in combination with mechanism for dropping short fur onto the moving layer until a certain quantity of mixed long and short fur has been fed forward, devices for stopping the feed of short fur while continuing the feed of long fur and exhausting mechanism to draw the fur as fed forward onto the hat-forming cone and form a hat therefrom, substantially as and for the purpose set forth.

3. In apparatus for forming fur hat-bodies, the combination of the perforated forming-cone, exhausting mechanism to draw the fur onto said cone, and a traveling apron for feeding forward a layer of fur, with a sieve above the said apron, means for imparting to the sieve a jolting motion, and means for stopping and starting the jolting movement of the sieve independent of the driving mechanism, substantially as set forth.

In testimony whereof I have signed my name to this specification in the presence of two subscribing witnesses.

EDWARD T. ROBINSON.

Witnesses:
ARTHUR E. HALL,
JOHN W. THOMAS.